(12) United States Patent
Shibuya et al.

(10) Patent No.: US 8,116,556 B2
(45) Date of Patent: *Feb. 14, 2012

(54) METHOD AND APPARATUS FOR ANALYZING DEFECT DATA AND A REVIEW SYSTEM

(75) Inventors: Hisae Shibuya, Chigasaki (JP); Yuji Takagi, Kamakura (JP)

(73) Assignee: Hitachi High Technologies Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/888,286

(22) Filed: Sep. 22, 2010

(65) Prior Publication Data

US 2011/0013825 A1  Jan. 20, 2011

Related U.S. Application Data

(63) Continuation of application No. 10/672,010, filed on Sep. 25, 2003, now Pat. No. 7,813,539.

(30) Foreign Application Priority Data

Sep. 27, 2002  (JP) ................... 2002-282173

(51) Int. Cl.
*G06K 9/00* (2006.01)
(52) U.S. Cl. ...................................... 382/141
(58) Field of Classification Search ........... 382/141–152
See application file for complete search history.

(56) References Cited

U.S. PATENT DOCUMENTS

| 5,240,866 | A | 8/1993 | Friedman et al. | |
|---|---|---|---|---|
| 5,982,920 | A | 11/1999 | Tobin et al. | |
| 5,991,699 | A | 11/1999 | Kulkarni et al. | |
| 6,009,545 | A * | 12/1999 | Tsutsui et al. | 714/718 |
| 6,130,959 | A | 10/2000 | Li | |
| 6,408,105 | B1 * | 6/2002 | Maruo | 382/281 |
| 7,016,526 | B2 | 3/2006 | Smilansky et al. | |
| 7,068,834 | B1 * | 6/2006 | Ikeda et al. | 382/145 |
| 7,231,079 | B2 * | 6/2007 | Okuda et al. | 382/145 |
| 7,813,539 | B2 * | 10/2010 | Shibuya et al. | 382/141 |
| 2002/0054704 | A1 * | 5/2002 | Smilansky et al. | 382/149 |
| 2006/0050950 | A1 * | 3/2006 | Tai et al. | 382/145 |

FOREIGN PATENT DOCUMENTS

| JP | 10-214866 A | 8/1998 |
|---|---|---|
| JP | 11-45919 A | 2/1999 |

* cited by examiner

*Primary Examiner* — Alex Liew
(74) *Attorney, Agent, or Firm* — Kilpatrick Townsend & Stockton LLP

(57) ABSTRACT

In a process for manufacturing a semiconductor wafer, defect distribution state analysis is performed so as to facilitate identification of the defect cause including a device cause and a process cause by classifying the defect distribution state according to the defect position coordinates detected by the inspection device, into one of the distribution characteristic categories: repeated defects, clustered defects, arc-shaped regional defects, radial regional defects, line type regional defects, ring and blob type regional defects, and random defects.

11 Claims, 16 Drawing Sheets

VOTING SPACE

POLAR COORDINATE
CONVERSION

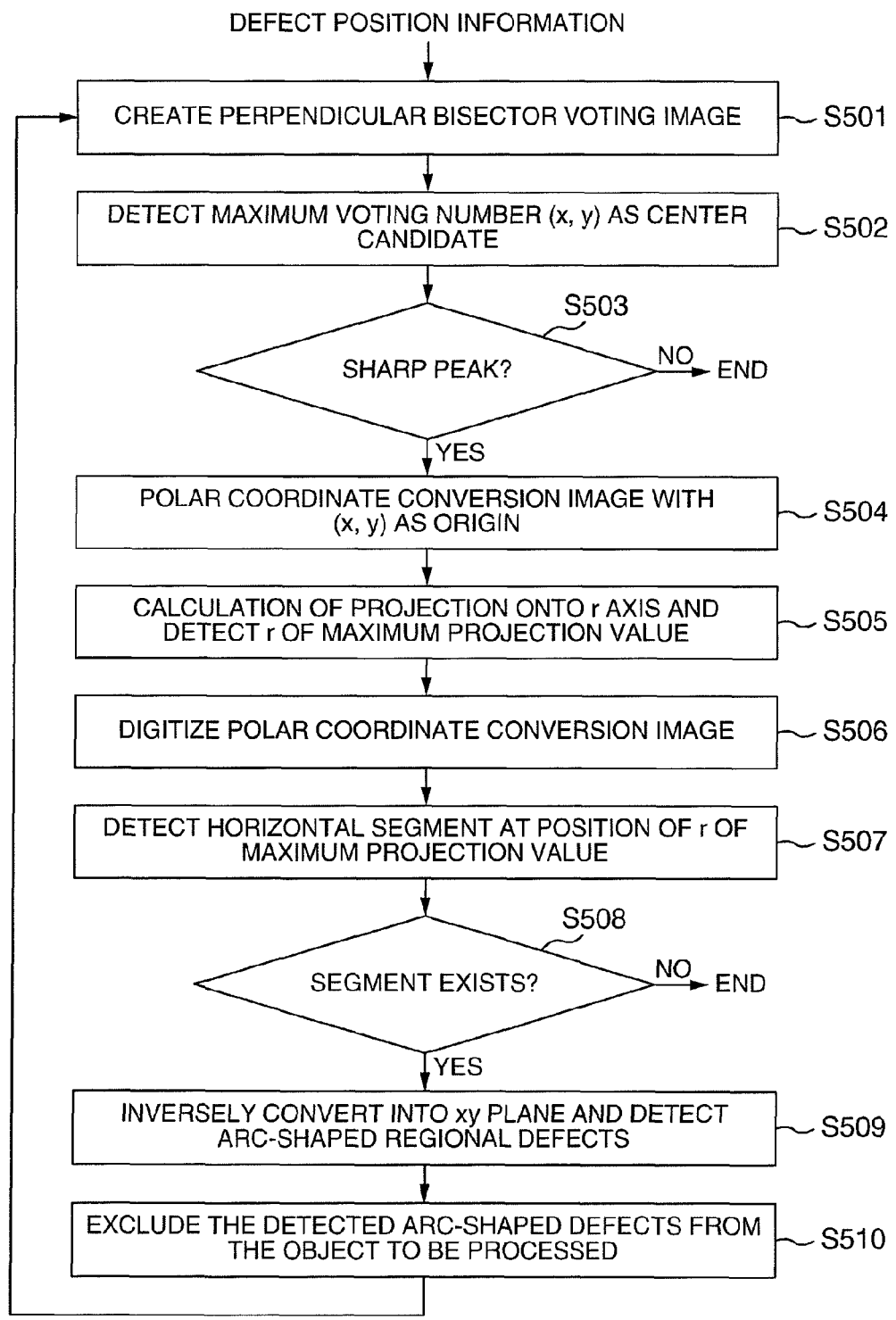

xy SPACE    ρθ SPACE xy SPACE    ρθ SPACE

FIG. 10A
FIG. 10B
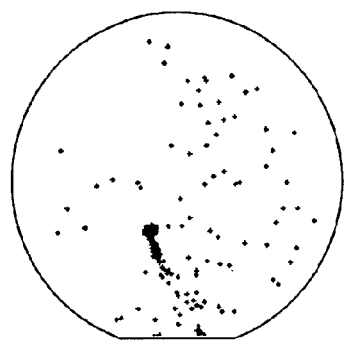
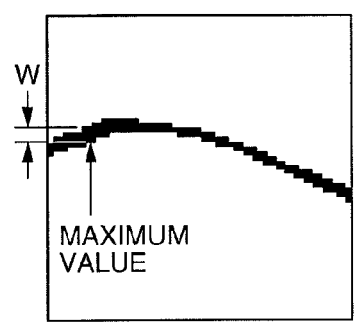
FIG. 10C    FIG. 10D    FIG. 10E    FIG. 10F
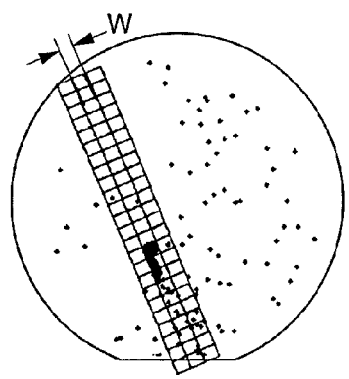
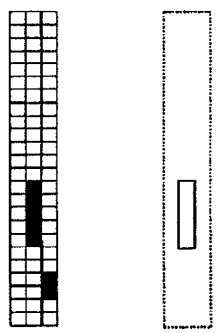
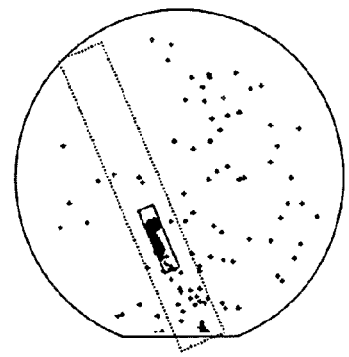

METHOD AND APPARATUS FOR ANALYZING DEFECT DATA AND A REVIEW SYSTEM

CROSS-REFERENCE TO RELATED APPLICATION

This application is a continuation application of U.S. patent application Ser. No. 10/672,010, filed on Sep. 25, 2003, which claims priority from Japanese Patent Application JP2002-282173, filed on Sep. 27, 2002, the content of both which are hereby incorporated in their entirety by reference into this application for all purposes.

BACKGROUND OF THE INVENTION

The present invention relates to a defect data analyzing method and apparatus and a review system for analyzing defect distribution state from defect data detected by an inspection apparatus in a semiconductor wafer manufacturing process.

In a semiconductor device manufacturing procedure forming a circuit pattern on a semiconductor substrate (hereinafter, referred to a semiconductor wafer manufacturing procedure), a pattern defect inspection or a foreign matter inspection is performed after each process and inspection result is analyzed, so as to improve the yield and stability. As one of such methods, a defect distribution state analysis is known. Most of defect distribution deflection is caused by a device failure or a process error. For this, it is tried to identify a defect cause by identifying a defect distribution pattern characteristic to a device failure or a process error.

There are conventional techniques concerning this as follows. JP-A-10-214866 discloses a method for recognizing a region where defects are concentrated in the defect distribution as a cluster and selecting a point of reviewing (viewing the detected defect by using an optical microscope or a scanning electron microscope) according to the area and shape of the cluster. JP-A-6-61314 discloses a method for dividing wafers into groups according to the state how the defect map is clustered and judging whether the state is similar to a known pattern so as to identify a defect cause. Moreover, JP-A-11-45919 discloses a method for identifying a defect cause by matching defect distribution image data with case database whose defect cause can be identified. U.S. Pat. No. 5,982,920 discloses a method for classifying defects into user-defined events associated with defect causes according to the defect distribution state.

According to the method disclosed in the aforementioned JP-A-11-45919, defect distribution image data is created by using the pixel value of the image data corresponding to the wafer region as a value proportional to the number of defects in the region corresponding to pixels. From the defect distribution image data, a blob of defect concentration, i.e., a cluster is detected. The cluster portion is matched with the case database. According to the information associated with the data of a high matching degree, a defect cause is identified.

According to the method disclosed in U.S. Pat. No. 5,982,920, according to the shape of the defect-concentrated portions, the concentrations of defects are classified into microstructure clusters, curvilinear clusters, and amorphous clusters and the other portions are classified as global. They are respectively classified into user-defined events and related to defect causes.

In the aforementioned methods, it is possible to recognize a cluster when a remarkable defect distribution pattern appears. However, in JP-A-11-45919, no consideration is taken on a case when the defect distribution pattern to be recognized is weak, i.e., when the defect density is low or when the difference between the inside and outside of the patter is small. According to the method disclosed in U.S. Pat. No. 5,982,920, such cases are classified as global. However, various shapes are involved there and should be classified into user-defined events so as to identify a defect cause.

SUMMARY OF THE INVENTION

It is therefore an object of the present invention to provide a defect data analysis method and device and a review system capable of coping with a weak defect distribution pattern and outputting information supporting to identify a failure cause at a high speed without requiring user definitions.

That is, the present invention provides a method for analyzing defect distribution from defect data obtained by inspecting a substrate processed in a process for forming a circuit pattern on a substrate. From the information on the defect position obtained by inspecting the processed substrate, distribution of the defect on the processed substrate is obtained and by using information on defect positions on the processed substrate, characteristic of the obtained defect distribution is classified into one of the following distribution characteristic categories: repeated defects, clustered defects, arc-shaped regional defects, radial regional defects, line type regional defects, ring and blob type regional defects, and random defects.

These and other objects, features and advantages of the invention will be apparent from the following more particular description of the embodiments of the invention, as illustrated in the accompanying drawings.

BRIEF DESCRIPTION OF THE DRAWINGS

FIG. 5 is a flow for identifying arc-shaped regional defects.

FIG. 10A to FIG. 10F explain the method for identifying the line type regional defects.

DESCRIPTION OF THE EMBODIMENTS

Description will now be directed to embodiments of the present invention with reference to the attached drawings.

Figure 1:
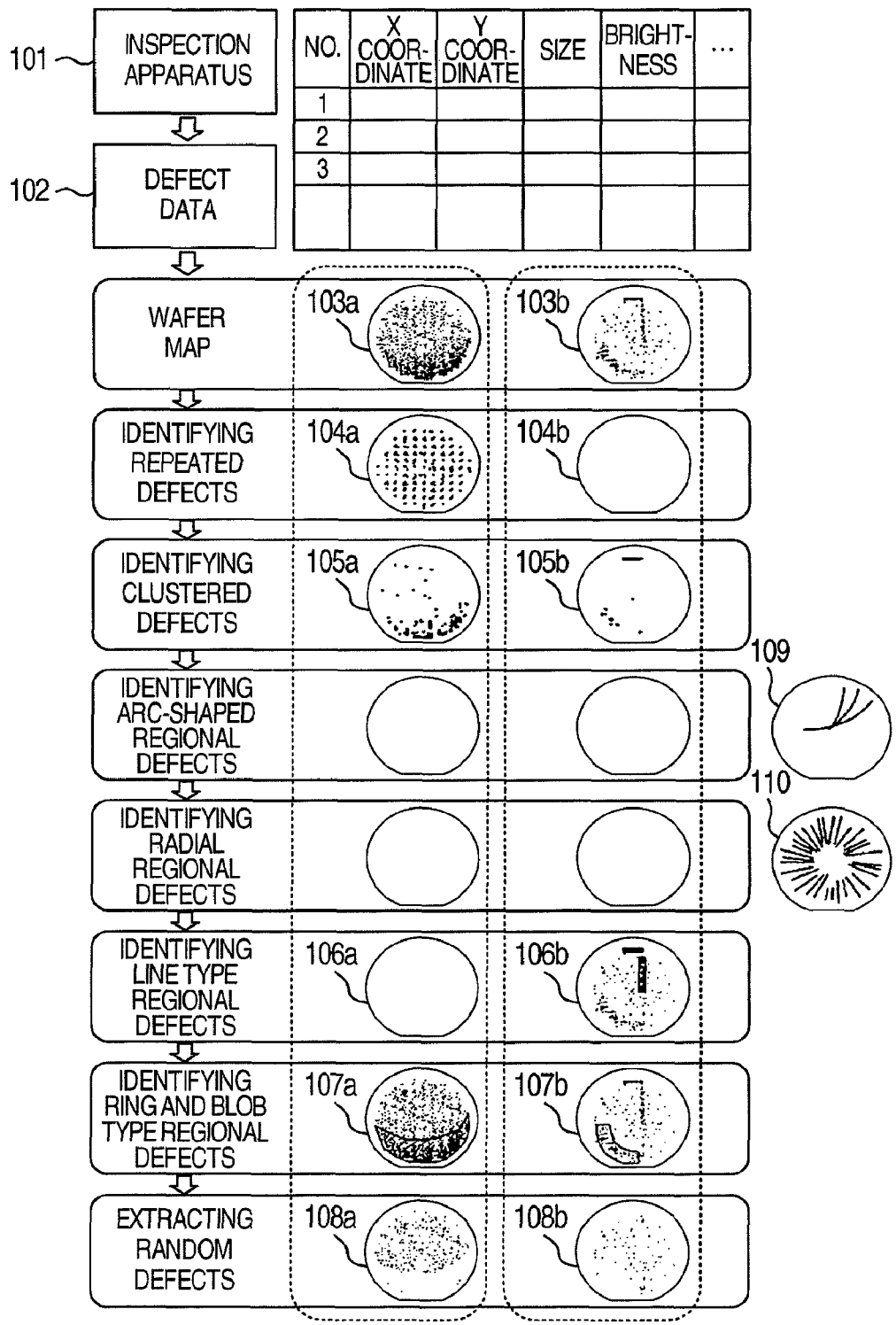
FIG. 1 is a diagram showing a concept of a defect data analysis method according to the present invention.

FIG. 1 is a diagram showing a concept of a defect data analysis method according to the present invention.

In the defect data analysis method according to a first embodiment of the present invention, defect data 102 output from a semiconductor wafer inspection apparatus 101 includes at least position coordinates of defects. 103a and 103b are wafer maps showing the defect positions on a coordinate system having one point on the waver as an origin. The defect position coordinates output from the inspection apparatus may be described by a coordinate system having one point on the wafer as an origin or a coordinate system having an origin for each chip. In the former case, X and Y coordinate values are directly used while in the latter case, the position coordinates in the chip should be converted into another coordinate system by using the chip arrangement information and the chip size information. According to the defect distribution state on the wafer map, defects are classified into the following defect distribution characteristic categories: repeated defects, clustered defects, arc-shaped regional defects, radial regional defects, line type regional defects, ring and blob type regional defects, and random defects.

The repeated defects are defects which are located at almost identical positions within a chip over a plurality of chips. The repeated defects are considered to be caused by reticle defects or fault alarm. The black points on 104a and 104b represent repeated defects corresponding to 103a and 103b, respectively.

Figure 2:
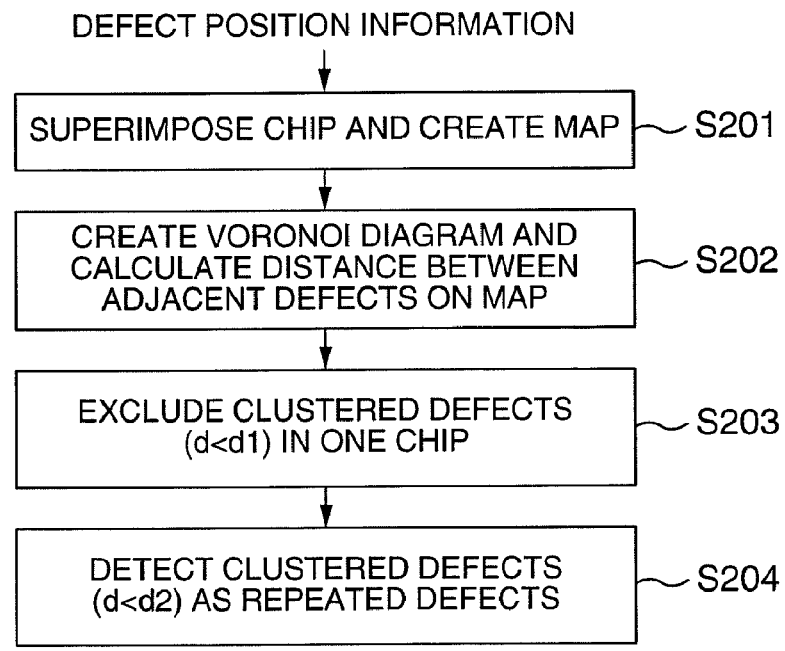
FIG. 2 is a flow for identifying repeated defects.

FIG. 2 shows a flow for identifying the repeated defects. Firstly, from the defect position coordinates, a chip-superimposed map is created by representing all the defect positions by chip origin-referenced coordinates (S201). When the defect position coordinates are described by an entire wafer coordinate system, it is necessary to perform conversion into the chip origin coordinate system by using the chip arrangement information and the chip size information. Next, a nearest-point Voronoi diagram is created to obtain a distance between adjacent defects on the chip-superimposed map (S202).

Figure 3:
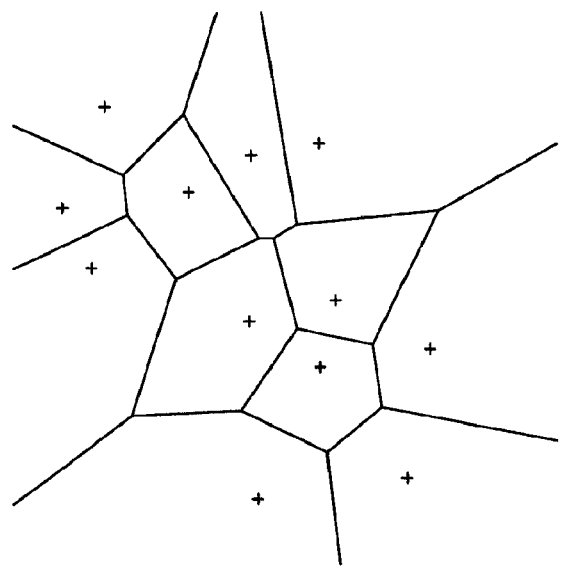
FIG. 3 is an example of the nearest-point Voronoi diagram.

FIG. 3 shows an example of the nearest-point Voronoi diagram. The nearest-point Voronoi diagram shows a region of influence of each coordinate point. The region of influence of coordinate point P is a set of points whose nearest coordinate points are P. This is expressed by a polygon surrounding the P, which is called a Voronoi cell of P. A point corresponding to the Voronoi cell adjacent to the Voronoi cell of P is an adjacent point of P. Next, clustered defects, i.e., adjacent defects in the same chip present at a distance d not greater than a predetermined threshold value d1 are excluded from the object to be processed (S203). Among the remaining defects, clustered defects, i.e., defects present at a distance d not greater than a predetermined threshold value d2 are combined into a group and the group consisting of a predetermined number or more of defects is detected as a repeated defect (S204). The repeated defects are numbered for each group. The in-chip coordinates, the number of constituting defects, and the number of chips characterizing the group are calculated and recorded.

Clustered defects are characterized in that the distance between the adjacent defects on the wafer map is very small. The clustered defects are considered to be caused by defocus and micro-scratch. The portions indicated by the black points 105a and 105b are clustered defects corresponding to 103a and 103b. In order to identify the clustered defects, defects at a distance not greater than a predetermined threshold value are connected into a group and a group consisting of a predetermined number of defects is detected as a clustered defect. A nearest-point Voronoi diagram corresponding to a wafer map is created to obtain a distance between adjacent defects, thereby checking whether the distance between the adjacent defects is equal to or smaller than a threshold value. Alternatively, it is possible to divide the wafer map into grids and check to which grid each point belongs, thereby checking whether the distance between the defects in the same grid or adjacent grids is equal to or smaller than the threshold value. Clustered defects are numbered for each group and the following factors characterizing the group are calculated and recorded: coordinates of center of gravity, maximum x/y coordinates, minimum x/y coordinates, area, defect density, number of defects, and so on.

Arc-shaped regional defects are defects distributed in the arc shape due to a scratch in the CMP (chemical mechanical polishing) process. Since the wafer maps 103a and 103b have no arc-shaped regional defects, an example of another wafer 109 is shown.

Radial regional defects are stripe-shaped defects extending from the center of the wafer toward outside. The radial regional defects are caused by foreign matters attached to a blow-out opening of a device for blowing gas from the center. Since the wafer maps 103a and 103b have no radial regional defects, another example of wafer 110 is given.

Line type regional defects are defects having the highest defect density distributed in a straight line. The line type regional defects are considered to be caused by a convey scratch or flow. Rectangular portions of 106a and 106b are line type regional defects corresponding to 103a and 103b. The line type regional defects are not arranged strictly in a line but have a certain width.

Ring and blob type regional defects are defects having a portion of the higher defect density distributed in a ring or blob shape. The ring and blob type regional defects are considered to be caused by a periphery peeling off or device stain. The portions surrounded by solid lines in 107a and 107b are ring and blob type regional defects corresponding to 103a and 103b.

Defects which have not been classified into any of the aforementioned defects are extracted as random defects. 108a and 108b show random defects corresponding to 103a and 103b.

Next, detailed explanation will be given on the method for identifying the arc-shaped regional defects according to the present invention with reference to FIGS. 4A and 4B and FIG. 5.

Figure 4A:
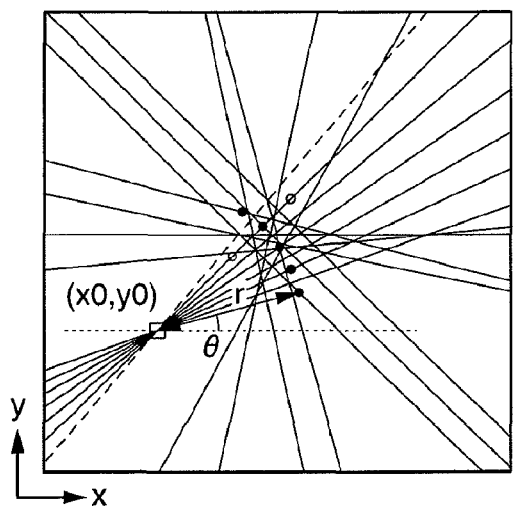
FIG. 4A and FIG. 4B explain the principle of detecting an arc.
Figure 4B:
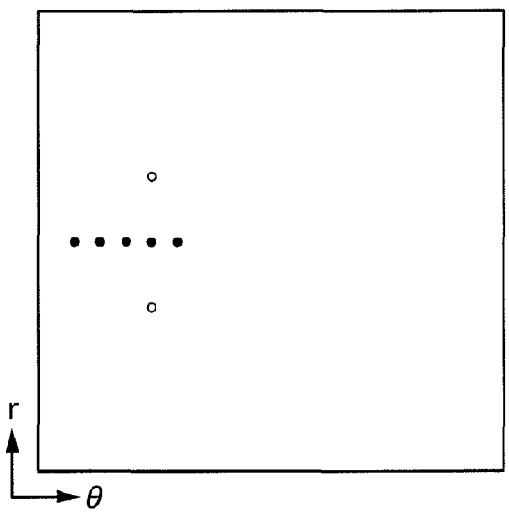

FIG. 4A and FIG. 4B explain the principle of the arc-shaped defect detection. As shown in FIG. 4A, when arbitrary two points on the arc shape are selected and a perpendicular bisector is drawn, the perpendicular bisectors intersect one another at one point, which is the center of the arc shape. From this, by voting points where the perpendicular bisectors of all the combinations of two points from the point group on the xy space pass to (x, y), it is possible to detect the maximum voting value (x0, y0) as the candidate of center of the arc. At this point of time, information on the radius r is lost and all the points are polar-coordinate-converted into (r, θ) using the center candidate (x0, y0) as the origin as shown in FIG. 4B. Since the radius r is constant, the point string on the arc in the xy space is distributed on a horizontal line in a polar coordinate space. Accordingly, by detecting a horizontal segment corresponding to an arc and inversely converting it into the xy space, it is possible to detect an arc.

FIG. 5 is a flow for identifying the arc-shaped regional defects according to the aforementioned principle of the present invention.

Firstly, two points are selected from the defect coordinates and voting is performed to a point where the perpendicular bisector of the points pass (S501). The voting space is twice or thrice larger than the wafer map. The selection of two points may include all the combinations but in order to reduce the time, they can be thinned at random. An appropriate pre-processing may be performed to exclude points judged to be not constituting the arc. For example, the aforementioned repeated defects are excluded. Moreover, among the clustered defects, defects of a blob having a very large width as compared to the arc shaped distribution is excluded. When performing voting, points too near from each other cause a large error and points too far from each other may have no relationship. Accordingly, weighting is performed according to the distance between the two points so as to reduce the contribution of the points too near or too far from each other.

Next, the maximum voting value (x, y) is detected as a center candidate (S502). Peak sharpness is checked by comparing with the surrounding values and if the peak is not sharp, the processing is terminated (S503). If the peak if sharp, by using the maximum voting value (x, y) as the origin, all the defect coordinates are converted into (r, θ) so as to create a polar coordinates converting image showing the defect density on the rθ space as a gray level (S504). Projection onto the r axis is calculated and the r of the maximum projection value is found (S505).

Next, a threshold value is calculated by an appropriate method such as a judgment and analysis method and a percentile method and the polar coordinates converting image is digitized (S506). At the maximum voting value r, a horizontal segment is detected (S507). Discontinuity not greater than a predetermined threshold value is assumed to be continuous and a continuous section not smaller than a threshold value is assumed to be a segment. If no segment is detected, the processing is terminated (S508). The segment detected is inversely converted into the xy space to obtain an arc. Defects present at a distance within a threshold value from the arc are detected as arc-shaped regional defects (S509). The arc-shaped regional defects detected are excluded from the object to be processed (S510) and control is returned to S501 to repeat the processing.

In this embodiment, explanation has been given on the method for detecting the center by voting perpendicular bisectors to the xy space. However, other methods can be used to detect the center. For example, there are a method for voting traces of circles passing through a single point to a parameter space of circles consisting of (x, y, r), and a method for selecting arbitrary three points, calculating a circle passing through these points, and voting it to the (x, y, r) parameter space.

Figure 6:
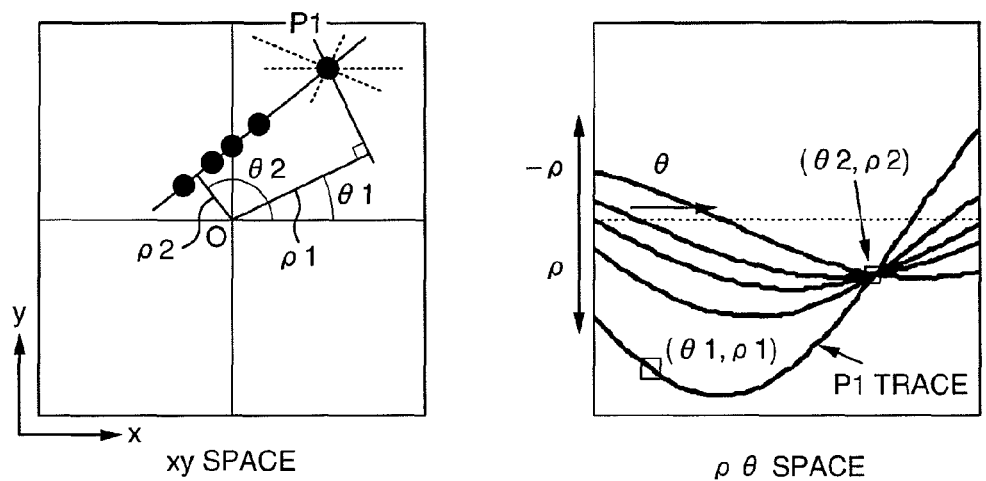
FIG. 6 explains the principle of the Hough transform.
Figure 7:
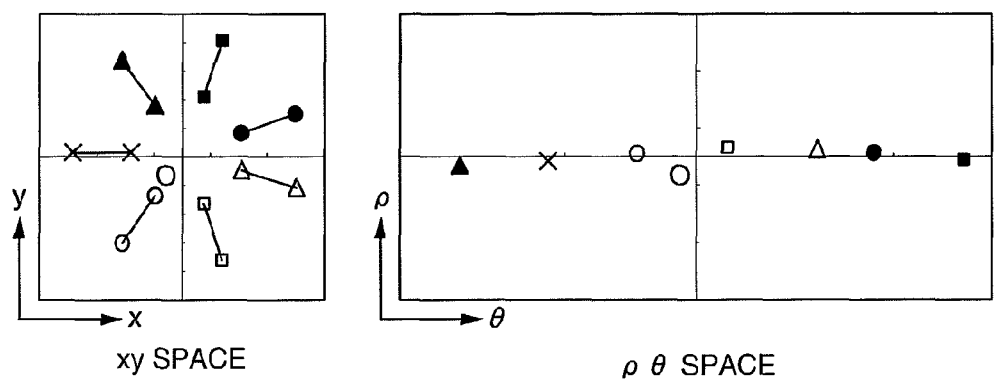
FIG. 7 shows an example of combinatorial Hough transform processing.

Next, detailed explanation will be given on a method for identifying radial regional defects with reference to FIG. 6 and FIG. 7.

For identification of the radial regional defects, it is possible to use a combinatorial Hough transform which is an improved Hough transform. Firstly, explanation will be given on the Hough transform. FIG. 6 explains the principle of the Hough transform. A straight line on the xy space is expressed by two parameters: a distance c from the origin and the angle θ of the perpendicular line. When a straight line passing through point P1 on the xy space is plotted onto the ρθ space, the trace is a curve passing through (θ1, ρ1) and (θ2, ρ2) as shown in the figure. For the other points on the xy space, it is possible to draw curves in the same way. When points are distributed on a straight line as shown in the figure, their traces intersect one another at (θ2, ρ2) representing a straight line passing through these points. Accordingly, ρθ space traces of points on the xy space are voted onto the (θ, ρ) and a straight line corresponding to the maximum voting number (θ, ρ) is detected.

The combinatorial Hough transform is also voting to the ρθ space but voting is performed only to one point on the ρθ space corresponding to a straight line passing through two points on the xy space. If the coordinates of the two points P1 and P2 on the xy space are (x1, y1) and (x2, y2), then the corresponding ρ and θ can be calculated by the following expressions.

$$\theta = \begin{cases} \tan^{-1}((x1-x2)/(y2-y1)) + \pi & \text{(if } y2-y1 < 0 \cap x1-x2 > 0) \\ \tan^{-1}((x1-x2)/(y2-y1)) - \pi & \text{(if } y2-y1 < 0 \cap x1-x2 \le 0) \text{ but } |x1| \ge |x2| \\ \tan^{-1}((x1-x2)/(y2-y1)) & (eles) \end{cases} \quad \text{(Expression 1)}$$

$$\rho = \cos\theta \cdot (x1+x2)/2 + \sin\theta \cdot (y1+y2)/2 \quad \text{(Expression 2)}$$

Here, P1 is the one having a greater absolute value of the x coordinate. In the normal Hough transform, the is in the range from −π/2 to π/2 but here it is in the range from −π to π. That is, not only the inclination of the straight line but its direction is also considered. FIG. 7 shows correspondence between combinations of two points on the xy space and the points on the ρθ space. Like symbols correspond to each other. As shown in the figure, when radial regional defects are present, a plenty of peaks are detected at different θ in the vicinity of ρ=0. This is utilized for identification of the radial regional defects.

Figure 8:
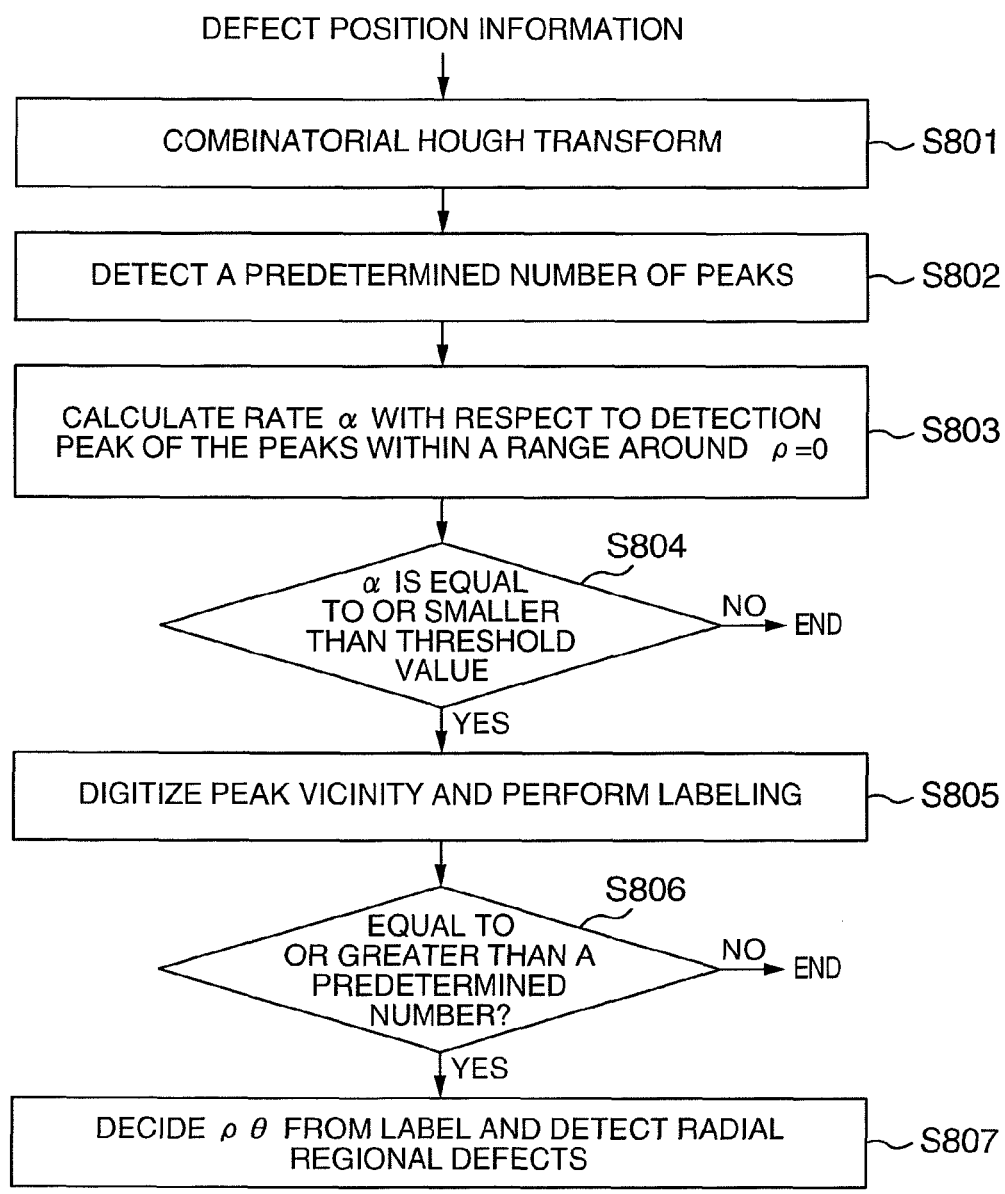
FIG. 8 is a flow for identifying radial regional defects.

FIG. 8 is a flow for identifying radio regional defects according to the present invention.

Firstly, arbitrary two points are selected on the defect coordinates and voting is performed to the point on the ρθ space corresponding to a straight line passing through the two points (S801). The method for selecting the two points may be all the combinations but in order to reduce the time, they can be thinned at random. Moreover, points in the vicinity of the center of the wafer are inevitably voted to the vicinity of ρ=0 and become a noise for the voting from the radial regional defects. Accordingly, it is possible to exclude defects whose distances from the center are equal to or below a predetermined value. When performing voting, in the same way as the identification of the arc-shaped regional defects, the distances between two points are weighted so as to reduce the contribution of the points too near or too far from each other.

Next, a predetermined number of peaks are detected in the descending order of the values (S802). When arc-shaped regional defects are present, voting is concentrated around $\rho=0$. Accordingly, in order to check the concentration degree, the ratio $\alpha$ of peaks in a predetermined range around $\rho=0$ against all the number of detected peaks is calculated (S803). The $\alpha$ may also be a ratio of voting performed to a predetermined range around c against all the voting. When the $\alpha$ is equal to or below a predetermined value, it is judged that no radial regional defects are present and the processing is terminated (S804).

Next, an appropriate threshold value is decided for the peaks present within a predetermined range around $\rho=0$ and the vicinity of the peaks, for example, an area of only 5×5 is digitized and labeled (S805). The threshold value may be decided to be a constant ratio against the peak value or decided from the higher value of the aforementioned vicinity area to make a predetermined number of pixels "1". If the number of labels is equal to or above a predetermined number, it is decided that radial regional defects are present (S806). The ranges of $\rho$ and $\theta$ are decided from each label size and corresponding defects on the xy space are detected as radial regional defects (S807).

Next, detailed explanation will be given on identification of line type regional defects with reference to FIG. 9 and FIG. 10A to FIG. 10F.

Figure 9:
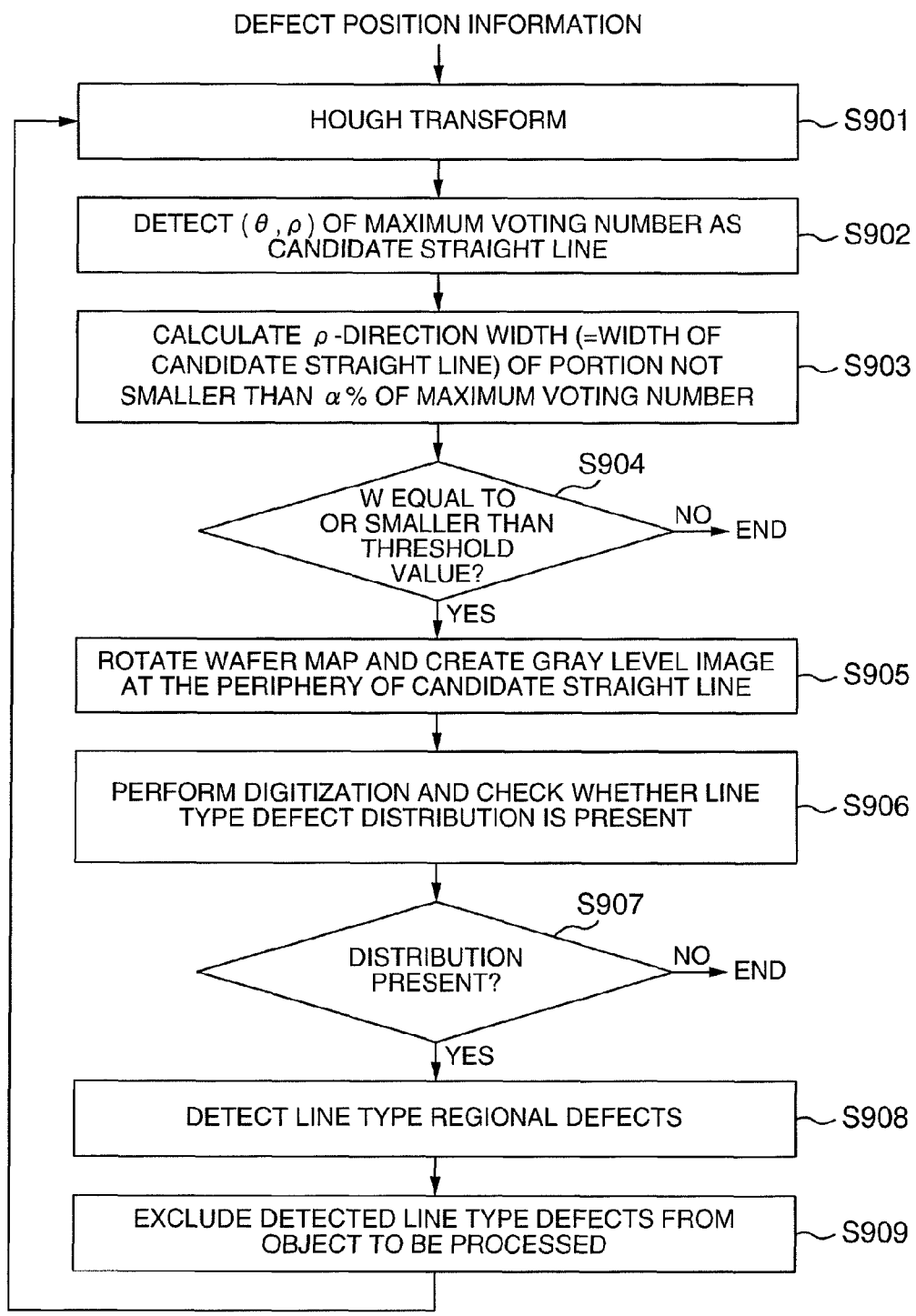
FIG. 9 is a flow for identifying line type regional defects.

Identification of line type regional defects according to the present invention uses the Hough transform. FIG. 9 shows a flow for identifying line type regional defects. FIG. 10A to FIG. 10F show examples of processing. Firstly, defect coordinates are subjected to the Hough transform (S901) and ($\theta$, $\rho$) of the maximum voting count is detected as a candidate straight line (S902). FIG. 10B is a Hough transform image corresponding to the wafer map shown in FIG. 10A. As has been described above, the line type defects have a certain width and the resolution of ($\theta$, $\rho$) is made rough. However, if normal Hough transform is performed, for example, there arises a problem that when clustered defects are present at two positions, a straight line connecting the two clustered defects is detected. The clustered defects may be distributed in a linear shape and accordingly, exclusion of the clustered defects adversely affects the result.

In order to solve this problem, contribution of the clustered defects is reduced by performing weighting proportional to the distance between defects or square of the distance between the defects when voting. For this, the nearest-point Voronoi diagram corresponding to the wafer map is created in advance and the distance between the defects is calculated. If a Voronoi diagram has been created when identifying the clustered defects, it can be used. Moreover, since one defect is present in a Voronoi cell, a reciprocal number of the area of the Voronoi cell may be considered as a local defect density in the corresponding coordinates. For the aforementioned weighting, it is possible to use the reciprocal number of the defect density, i.e., the Voronoi cell area.

Next, as shown in FIG. 10B, a width W of the $\rho$ direction of a portion not smaller than $\alpha$ % of the maximum voting count around the candidate straight line is calculated (S903). The $\alpha$ is a predetermined threshold value and W is considered to be a width of the candidate straight line. Next, check is made to determine whether the W is not greater than the predetermined threshold value. When the width is greater than the threshold value, i.e., when the width is too great, it is judged not line type regional defects are present and the processing is terminated (S904). When the width is smaller than the threshold value, the wafer map is rotated by $\theta$ and a gray level image representing the density around the candidate straight line is created (S905). Here, the image size is made identical to W.

The grating shown in FIG. 10C corresponds to the pixels of a gray level image. It should be noted that in the figure, instead of rotating the wafer map by $-\theta$, the grating is rotated by $\theta$. The gray level image is created by corresponding a greater pixel value to the grid having a high defect density and a small pixel value to the grid having a low defect density. For example, the pixel value is proportional to the number of defects in the grid. It is possible to perform weighting such that performed upon the Hough transform processing in order to reduce the contribution of the clustered defects.

Next, by using an appropriate method such as judgement and analysis method, the gray level image is digitized as shown in FIG. 10D and from the digitized image, it is decided whether line type regional defects are present (S906). The portions shown in black in FIG. 10D are candidate of the line type regional defects. Since the center row corresponds to the position of the candidate straight line, the presence/absence of the line type regional defects is decided by the length of the candidate portion of the central row, whether the candidate portion is continuous, by presence/absence of distribution in the right and left rows converted into numeric values which are compared to a predetermined threshold value.

In the example shown in FIG. 10D, the rectangular portion indicated by a solid line in FIG. 10E can be judged to be a line type distribution. When no line type distribution is present, the processing is terminated (S907). When the line type distribution is present, as shown in FIG. 10F, FIG. 10E is rotated by $\theta$ so as to be superimposed on the corresponding position of the wafer map and the defects inside the solid rectangular shape are detected as line type regional defects (S908).

The line type regional defects detected are excluded from the object to be processed (S909) and control is returned to S901 to repeat the processing. For each line type regional defects which are detected by one processing is added by a group number and its position, width, angle, length, defect density, and other characteristic amounts are calculated and recorded.

Figure 11:
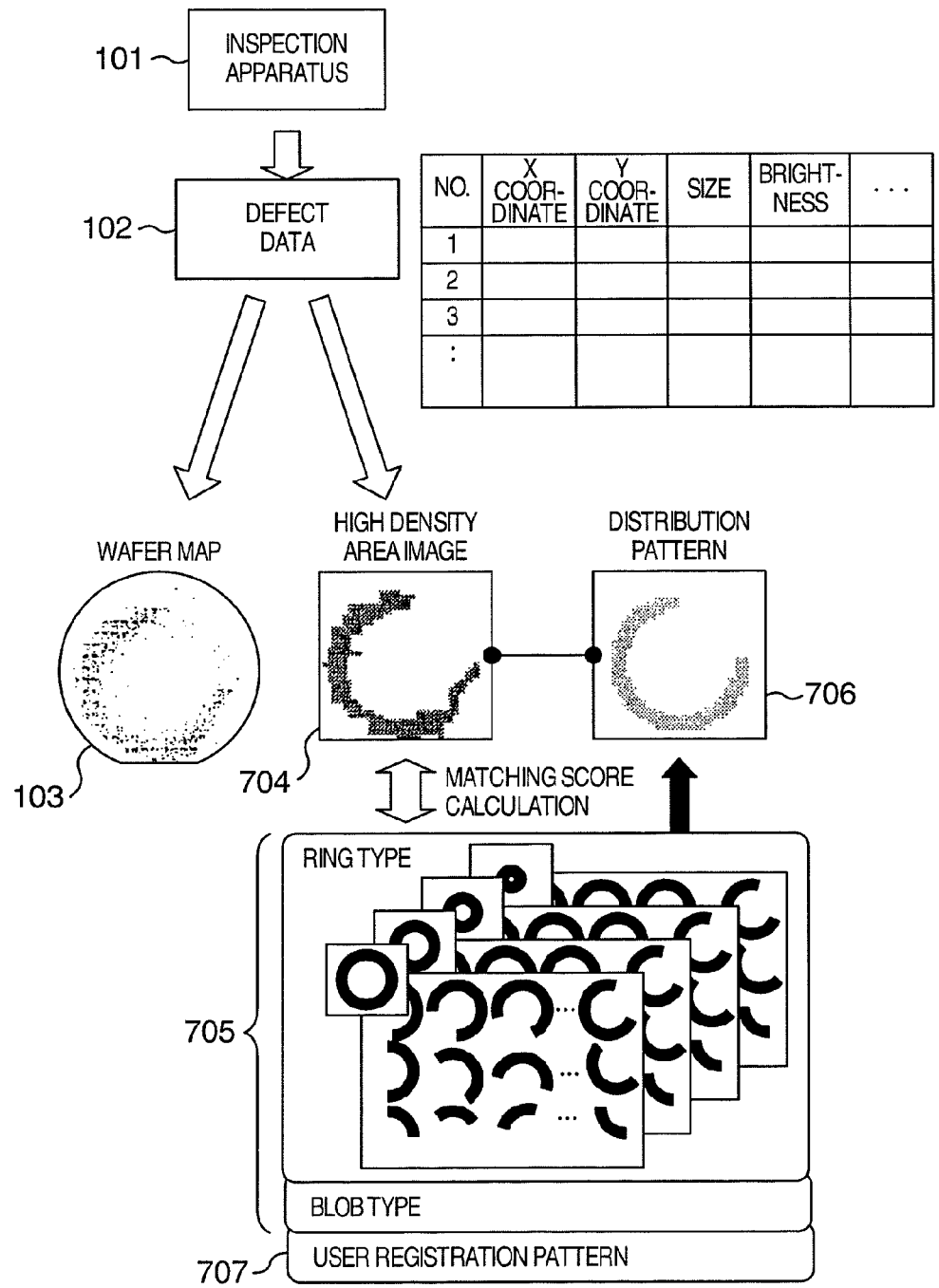
FIG. 11 is a diagram showing a concept of identification of ring and blob type regional defects.

Next, detailed explanation will be given on the method for identifying the ring and blob type regional defects according to the present invention. FIG. 11 shows a concept of identification of the ring and blob type regional defects according to the present invention. In the first step, a digital image is created by expressing higher defect density portions by 1 and lower defect density portions by 0 according to the defect position coordinates. Hereinafter, this image will be referred to as a high density area image 704. In the next step, a plurality of geometric template patterns 705 are automatically created in accordance with the image size of the high density area image 704. Next, matching scores are calculated between the high density area image 704 and the automatically created plurality of geometric template pattern images 705. In the last step, a pattern image 706 having the highest matching score is selected.

According to another embodiment of the present invention, in addition to the automatically created geometric template patterns 705, a user registers a template pattern 707 in advance and a pattern image 706 having the highest matching score is selected. The pattern image 706 is superimposed on the wafer map 103 and defects contained in the pattern portion are detected as ring and blob type defects.

Next, each step will be detailed.

Firstly, explanation will be given on the method for creating the high density area image 704 according to the defect position coordinates.

Figure 12:
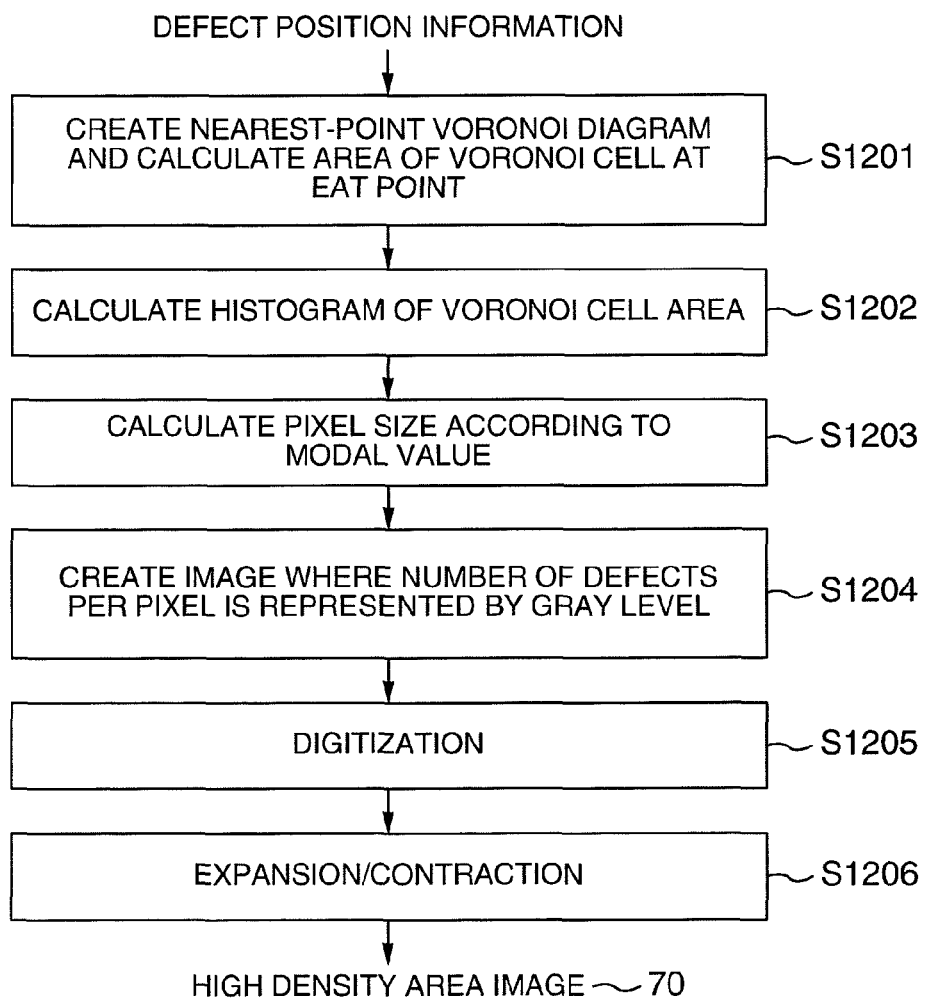
FIG. 12 a flow for creating a high-density region image.

FIG. 12 shows a flow for creating the high density area image 704.

Firstly, a nearest-point Voronoi diagram is created for coordinates of all the defects and an area of Voronoi cell of each point is calculated (S1201). If this calculation has been performed in the aforementioned line type regional defect identification, the results can be used here. Next, a histogram of the area of the Voronoi cell is calculated (S1202). It should be noted that the defects which have been classified into the repeated defects, clustered defects, or the line type regional defects are not included in the histogram. A modal value is obtained from the histogram and the modal value is multiplied by a predetermined number (N). Its square root is calculated to be a pixel size (S1203). The image size is determined so that the entire wafer is contained just in one image and an image where the number of defects per pixel is represented by the gray level is created (S1204). Such a image can be created by initializing all the pixels to 0 and incrementing the pixel value of the position corresponding to the coordinates of each defect. Here, if the N is too large, the image size is small and it becomes difficult to recognize the shape. The N is preferably about 5. On the contrary, if the N is too small, the difference between the gray levels between the high density portion and the low density portion becomes small and it becomes difficult to recognize the difference.

Next, a predetermined threshold value (T) is used to obtain a digitized image in which high density portions are expressed by 1 and low density portions are expressed by 0 (S1205). Here, the value T is preferably similar to the N. In the image obtained, a pattern of relatively high defect density can be seen. Lastly, the pattern is subjected to expansion/contraction processing to obtain a high density area image 1104 (S1206). By creating an image by such a method, even if the distribution density is low, it is possible to set an appropriate image size and extract a relatively high density area. Moreover, another method can be used by creating a gray image in S1204 and performing digitization in S1205. Each defect is weighted proportionally to the shortest distance to the adjacent defect or its square or Voronoi cell area and it is added to the pixel value at the corresponding position so as to create a gray image and perform digitization by using the judgment and analysis method Next, explanation will be given on the automatic creation of the geometric template pattern image 705.

The geometric template pattern image 705 is automatically created separately for the ring pattern and blob pattern. The image size is identical to the high density area image 704 and the pattern is created as follows by using the maximum circle that can be drawn on the image as a reference.

Figure 13:
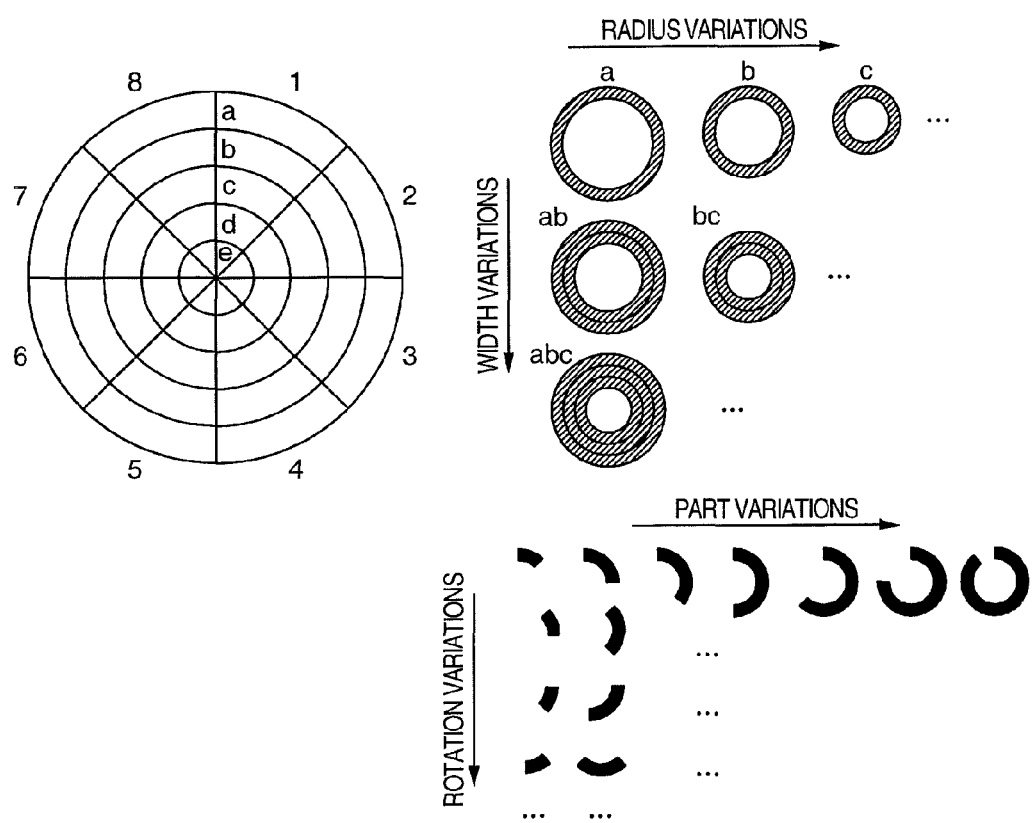
FIG. 13 explains automatic creation of a ring-shaped template pattern.

The ring pattern is created by combination of small areas obtained by equally dividing the reference circle into concentric circles in the radial direction and equally dividing by sectors in the center angle direction. FIG. 13 shows an example of pattern divided into five portions in the radial direction and eight portions in the center angle direction. Explanation will be given on the method of combination of the small areas using an example of a pattern divided into five parts in radial direction and eight parts in the center angle direction. Firstly, symbols a, b, c, d, and e are assigned to the concentric annuluses (the innermost one is a circle) obtained by dividing the circle in the radial direction in the order counted from the outside and numbers 1 to 8 are assigned to the sectors obtained by dividing the circle into eight equal sectors in the center angle direction. There are fifteen combinations of complete annulus or circle size: a, b, c, d, e, ab, bc, cd, de, abc, bcd, cde, abcd, bcde, and abcde. As for the part variations of the annuluses, there are eight combinations for each of the sizes: one eighth, two eighths, three eighths, four eighths, five eighths, six eighths, seven eighths. For example, for the size of two eighths, there are combinations of 12, 23, 34, 45, 56, 67, 78, 81. By adding a complete annulus to these combinations, 57 combinations can be considered. For each of them, the aforementioned 15 size combinations can be considered. Accordingly, 855 combinations of patterns are generated in total.

The division in the radial direction and the center angle direction may be different from this. Moreover, the division may be performed not equally. However, the equal division is preferable to simplify the processing.

The blob type pattern is generated by a combination of small areas obtained by dividing the reference circle into ellipses having major axes in the vertical direction equally in the horizontal direction and dividing the reference circle into ellipses having major axes in the horizontal direction equally in the vertical direction.

Figure 14A:
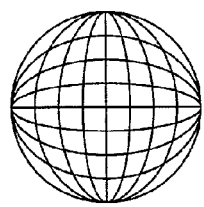
FIG. 14A to FIG. 14G are diagrams explaining the method for automatic creation of a blob-shaped template pattern.
Figure 14B:
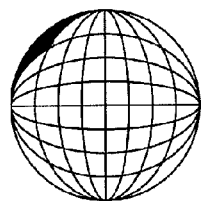
Figure 14C:
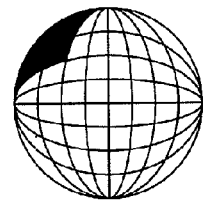
Figure 14D:
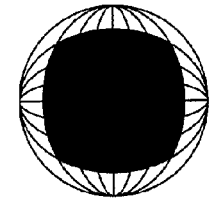
Figure 14E:
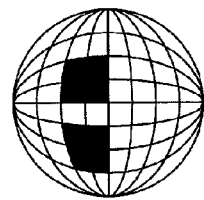
Figure 14F:
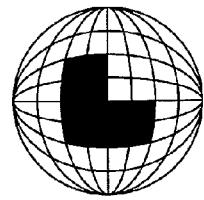
Figure 14G:
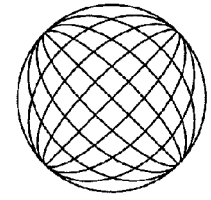

FIG. 14A shows an example of dividing the reference circle into eight ellipses in the horizontal and the vertical directions. There are eight size combinations from 1 to 8 and (9-N) combinations of positions when the size is N in the horizontal direction. Accordingly, there are 36 combinations in total. There are also 36 combinations in the vertical direction. Consequently, 1296 patterns can be generated by combinations of the horizontal direction and the vertical direction. FIG. 14B to FIG. 14D show examples of patterns generated by this method. The black portions correspond to the patterns. A combination of separate areas as shown in FIG. 14E or the irregular pattern as shown in FIG. 14F are not generated by this method. The blob type pattern may also be obtained by rotating the reference circle by 45 degrees around the its center. FIG. 14G shows the areas obtained in this case. It is possible to use one of the reference circles or both of them. Moreover, the number of divisions may be other than eight.

By automatically generating the geometrical template pattern image 705 by the aforementioned methods, it is possible to reduce the number of pattern to a practical level, thereby realizing a high speed processing.

Figure 15:
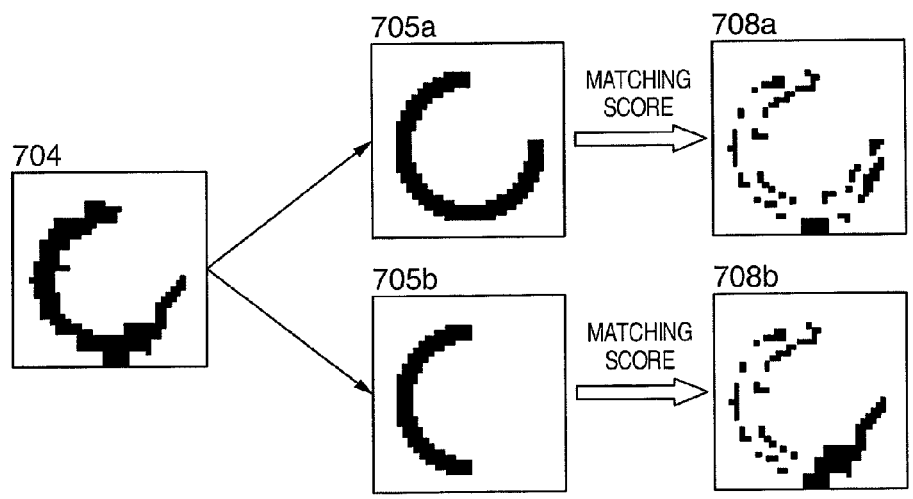
FIG. 15 shows diagrams for explaining the method for calculating matching score of the high-density region image with the template pattern image.

Next, explanation will be given on the method for calculating the matching score between the high density area image 704 and the template pattern image 705 with reference to FIG. 15. Each pixel value of the high density area image 704 is compared to the pixel value of the identical address of the template pattern image 705. If matched, +1 is obtained and if not matched, −1 is obtained. The comparison results of all the pixels are totaled and the obtained value is used as the matching score. In FIG. 15, the high density area image 704 and the template pattern image parts 705*a* and 705*b* are shown by expressing the pixel value 1 by black and pixel value 0 by white. 708*a* and 708*b* show unmatched portions between the high density area image 704 and the template pattern images 705*a* and 705*b* by black. That is, in these images, the pixel value of the white portion is 1 and the pixel value of the black portion is −1. The total of all the pixel values is the matching score. When 708*a* is compared to 708*b*, 708*a* has a smaller black area and accordingly, 705*a* has a higher matching score with the high density area image 704 than 705*b*.

According to the method explained above, the pattern 706 is detected without fail. Actually, however, when the density is very low or the density difference is very small, it is better not to obtain any pattern. Accordingly, the detected pattern 706 is verified to judge whether a pattern is present. Hereinafter, explanation will be given on the judgement method for presence/absence of a pattern and the pattern detection sensitivity adjustment method. In order to judge whether a pattern is present, a gray level image is created by the method for performing weighting when creating the high density area image 704 and the gray level image obtained is used. The detected pattern image 706 is superimposed on the gray level image and a ratio C of the judgment/analysis value inside and outside the pattern is calculated from the pixel values of the gray level image by using the following expression.

$$C = \frac{\omega_p \omega_b (\mu_p - \mu_b)^2}{\omega_p \sigma_p^2 + \omega_b \sigma_b^2} \quad \text{(Expression 3)}$$

wherein, $(\omega_p, \omega_b;)$ number of pixels inside and outside the pattern $(\mu_p, \mu_b;)$ average value of pixel values of gray level image inside and outside the pattern $(\sigma_p, \sigma_b;)$ standard deviation of pixel values of gray level image inside and outside the pattern The C is compared to a predetermined threshold value and if the C is equal to or below the threshold value, it is judged that there is no pattern. Moreover, when the modal value in the histogram obtained in S1202 is lower than a predetermined threshold value, no more processing is performed and it is judged that there is no pattern. When the former threshold value is set to a small value, it is possible to detect a patter of a smaller density difference. Moreover, when the latter threshold value is set to a small value, it is possible to detect a pattern of a smaller defect density. If these threshold values can be specified by a user, the user can adjust the sensitivity.

Figure 16:
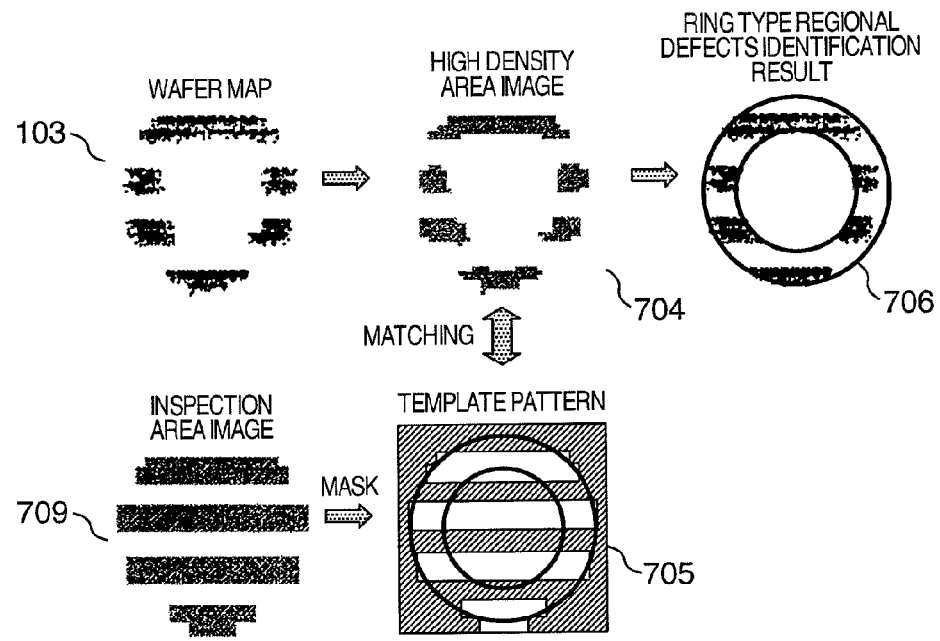
FIG. 16 shows diagrams for explaining the concept of ring and blob type distribution applicable to a partially inspected wafer.

By the way, the semiconductor wafer inspection does not always inspect the entire surface because of the throughput restriction. It is often the case that a partial inspection is performed by specifying inspection/non-inspection for each chip row. In this case, the pattern detection cannot be performed easily by using the aforementioned ring and blob type regional defect identification. In order to solve this problem, another method for identifying the ring and blob type defects will be explained with reference to FIG. 16. FIG. 16 shows a concept of identification of the ring and blob type defects applicable to defect data of a partial inspection wafer. When a partial inspection is performed, a wafer map 103 looks as shown in the figure, for example. In the same way as has been described above, the high density area image 704 is created and a geometrical template pattern 705 is automatically created. On the other hand, according to the inspection condition information and the chip matrix data, an inspection area image 709 is created. The inspection area image 709 is superimposed on the geometrical template pattern 705. The non-inspection area is masked and the matching score is calculated. That is, the template pattern image 705 and the inspection area image 709 of the high density area image 704 are simultaneously scanned. If the area is the non-inspection area, then 0 is obtained. If the area is the inspection area and if the pixel value of the high density area image 704 matches with the pixel value of the template pattern image 705, then +1 is obtained. Otherwise, −1 is obtained. These values are totaled to obtain the matching score. Thus, the matching score with each template pattern 705 is calculated and a pattern image 706 of the highest matching score is selected. According to this method, even in the partial inspection, it is possible to accurately calculate the matching score with the template pattern 705 and accordingly, it is possible to identify the ring and blob type region defects.

Next, explanation will be given on the user pattern registration method.

Figure 17:
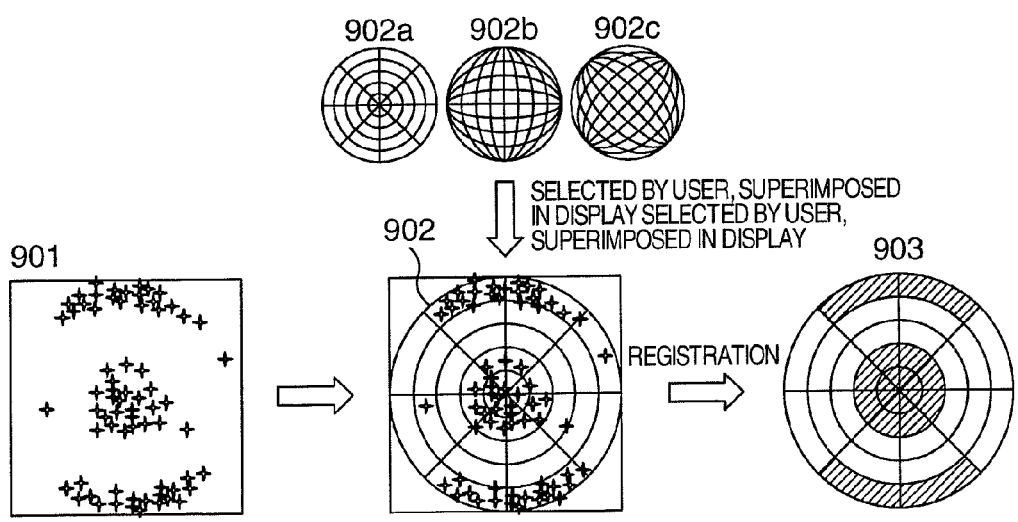
FIG. 17 explains a first user pattern registration method.

FIG. 17 explains the user pattern registration method. Firstly, a user specifies a wafer map 901 having the pattern to be registered and display it on the screen. This specification may be omitted. In this case, nothing is displayed. Next, one of the division patterns 902*a* to 902*c* is selected for automatic creation of the geometric template pattern. 902*a* is identical to the ring type pattern shown in FIG. 13. 902*b* and 902*c* are identical to the blob type pattern shown in FIG. 14A and FIG. 14G, respectively. The division pattern 902 selected is superimposed on the wafer map 901. Moreover, each of the small areas of the selected division pattern 902 is switched between selection and non-selection states according to the user specification and the areas selected are displayed with a different color.

The user selects a position having a high defect density or arbitrary small areas on the wafer map and specifies registration after the selection. The combination of the small area selected is compared to the pattern automatically created. If the combination is not included in the pattern automatically created, the pattern image 903 is stored as the user registration pattern 707. According to this method, it is enough to encode the combination of selected small areas and record it as the user registration pattern instead of using a pattern image.

Figure 18:
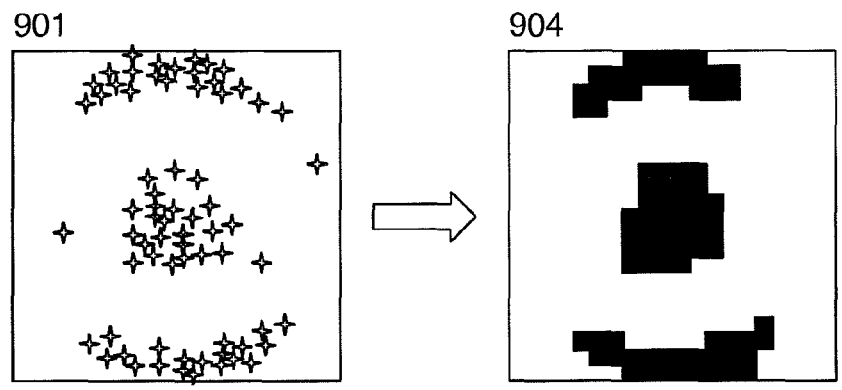
FIG. 18 explains a second user pattern registration method.

FIG. 18 explains a user pattern registration method which is different from the aforementioned. A user specifies the wafer map 901 having the pattern to be registered and display it on the screen. A high density area 904 is created according to the aforementioned high density area image creation method and displayed on the screen. Matching scores are calculated between the high density area 904 and the template pattern automatically created and the user registration pattern already registered. When the maximum value of the matching scores is not greater than a predetermined threshold value, it is registered as the user registration pattern 707. In this case, the user registration pattern 707 is recorded as image data.

As the user pattern registration method, it is possible to provide the aforementioned two methods or one of them. Moreover, it is possible to use a method different from the aforementioned methods.

In the defect data analysis method according to a second embodiment of the present invention, when identifying ring and blob type regional defects, by adding information associated with the geometric template pattern 705 automatically created and the user registration pattern 707, the pattern image 706 is selected in the same way as the first embodiment.

The information added includes pattern position, size, shape, importance, and special matter. The pattern position, size, and shape of the geometric template pattern 705 are roughly classified according to a certain rule and default information is added. For the blob type pattern, the pattern position is classified, for example, upper right, top, upper left, right, center, left, lower right, bottom, and lower left. The size is classified, for example, into large, intermediate, and small. The shape is a blob. For example, FIG. 14B has a small size blob pattern at the upper left, FIG. 14C has an intermediate size blob pattern at the right, and FIG. 14D has a large size blob pattern at the center. As for the ring type pattern, it is a radius-size quarter ring pattern at the upper right. It should be noted that even if the pattern derives from a blob type pattern, the pattern is handled as a ring pattern if the pattern consists of only one outer row, and even if the pattern derives from a ring pattern, the pattern is handled as a blob pattern if the innermost circle is contained.

Furthermore, the geometric template pattern 705 and the user registration pattern are manually grouped and means is provided for collectively adding information, so that the same information can be added to the patterns which the user consider identical. Thus, it is possible to adjust resolution of the position and size information. The information of importance is input by the user. The special matter includes information associated directly with the defect causes.

Next, explanation will be given on an inspection apparatus using the defect data analysis method according to a first embodiment of the present invention. In the explanation below, repeated defects, clustered defects, line type regional defects, ring and blob type regional defects, and random defects are called regional characteristic categories. As the semiconductor wafer inspection apparatus, there are known a foreign matter inspection apparatus, an optical pattern defect inspection apparatus, SEM type pattern defect inspection apparatus, and the like. The inspection apparatus of the present invention inspects a semiconductor wafer by one of the known methods used in the aforementioned inspection apparatuses, uses the obtained defect data information to classify the defects into the distribution characteristic categories, and outputs the category information together with the defect data information.

Figure 19:
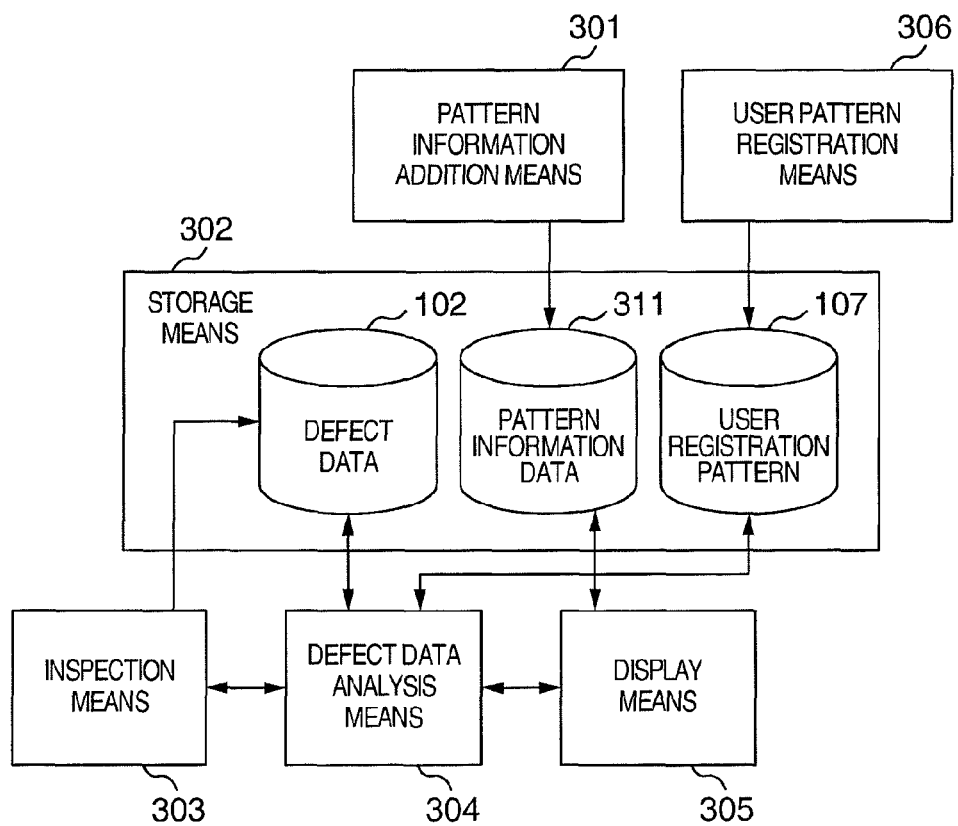
FIG. 19 is a first configuration example of the inspection device according to the present invention.

FIG. 19 shows configuration of the inspection apparatus according to the first embodiment of the present invention.

Pattern information addition means 301 adds information associated with a pattern such as pattern position, size, shape, importance, and special matter to a plurality of geometric template patterns automatically created and the user registration template pattern. The pattern information addition means 301 consists of a section for adding default information to the geometric template pattern and a section for manually adding information to the user registration template pattern. The pattern information addition is performed offline. The addition is performed at least once and the result is stored as a pattern information file 311 in storage means 302 such as a hard disc.

The defect data analysis may be performed in both of the inline and offline modes.

The inspection apparatus 303 inspects the wafer according to a known method and stores defect data 102 including at least defect position coordinates in the storage means 302.

In the case of inline mode, the inspection means 303 transmits notification of the inspection end to the defect data analysis means 304 upon completion of an inspection of each wafer. The defect data analysis means 304 reads the defect data 102 of one wafer from the storage means 302. Alternatively, the defect data 102 may be passed without using the storage means 302.

In the case of offline mode, the defect data analysis means 304 reads defect data 102 of the wafer specified by an operator.

The defect data analysis means 304 performs classification into the distribution characteristic categories according to the defect position coordinates and adds a distribution characteristic category number and a group number within the category to defect data of each defect. When ring and blob type defects are detected, the pattern information file 311 is read out from the storage means 302. A pattern image number or pattern information is added to the defect data of the ring and blob type regional defects and it is stored as defect data 102 including the inspection and analysis results in the storage means 302. In the case of inline mode, the end of the analysis is notified to the inspection means 303.

The result of classification into the distribution characteristic categories is shown on the display means 305. Different categories may be displayed by different colors on the wafer map or as shown in FIG. 1, a wafer map may be created for each of the categories. Simultaneously with this, the chip may be superimposed on the map. Moreover, the pattern image 706 selected in identification of the ring and blob type regional defects is displayed together with the information associated with the wafer to be inspected and the pattern information added to the pattern on the display means 305. Simultaneously with this, it is related to the wafer to be inspected and stored as an image file. Moreover, when a line type regional defect is detected, the rectangular shape showing the position is superimposed on the wafer map and information on the position, width, angle, length, defect density and the like is displayed. These information are related to the wafer to be inspected and stored.

The user pattern registration means 306 creates a user registration pattern by an instruction by an operator and stores the pattern code or pattern image in the storage means 302 according to the aforementioned method difference. It is also possible to configure the apparatus without any user pattern registration means 306.

Next, explanation will be given on an inspection apparatus having the defect data analysis method according to a second embodiment of the present invention. The second embodiment inspects a semiconductor wafer by a known method, uses the obtained defect data information to classify defects into the distribution characteristic categories according to the aforementioned method, performs sampling according to a rule specified for each category, and outputs the defect data, the classification result, and sampling result.

Figure 20:
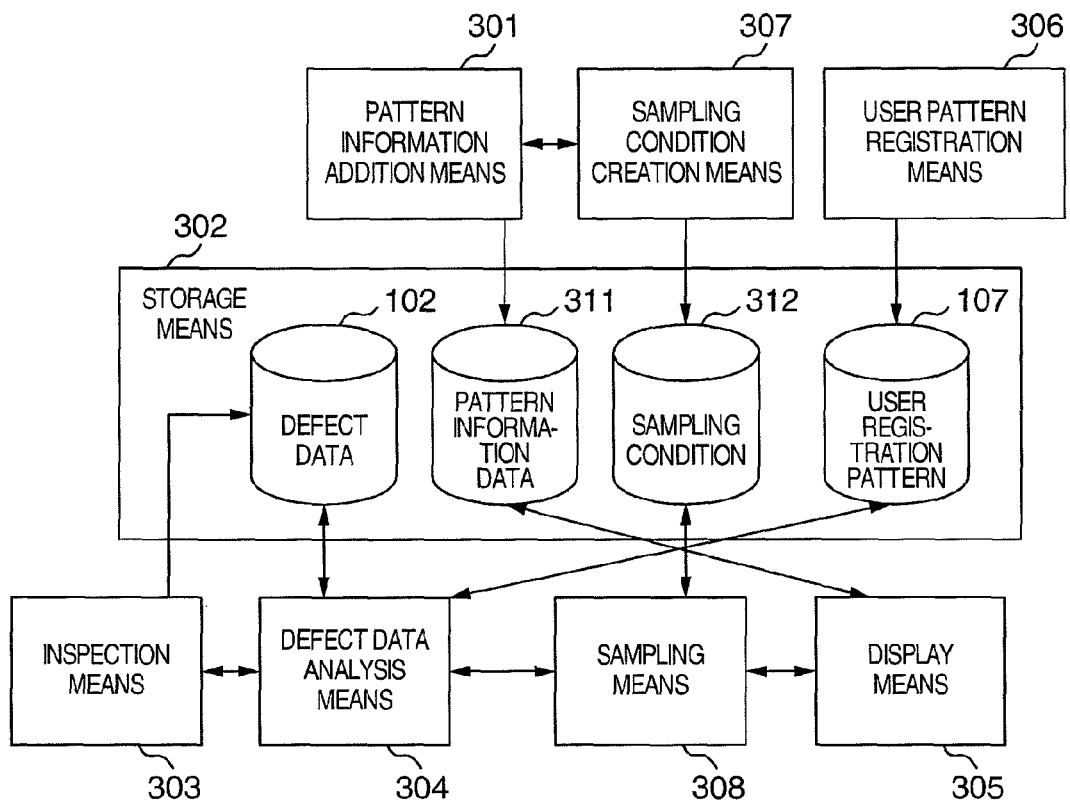
FIG. 20 is a second configuration example of the inspection device according to the present invention.

FIG. 20 shows configuration of the inspection apparatus according to the second embodiment of the present invention.

The pattern information addition means 301 adds a sampling condition number in addition to the aforementioned information. By manually grouping the template patterns using the same sampling condition, the same sampling number is added. When no sampling condition is present corresponding to the number, a sampling condition is created by sampling condition creation means 307.

The sampling condition creation means 307 creates a sampling condition to decide a defect for performing review. The sampling condition related to the ring and blob type regional defect pattern and sampling conditions of other distribution characteristic categories are manually created and stored as a sampling condition file 312 in the storage means 302. The sampling condition may be, for example, the sampling count or the sampling ratio and sampling method. The sampling count or the sampling ratio is selected before entering a numeric. The sampling count is decided by the sampling ratio for the number of defects in the pattern. As for the sampling method, a random method, a defect number sequence method and other considerable methods are listed up, so that the user can select one from them. When the defect number sequence is specified, sampling is performed at the interval in accordance with the sampling ratio.

The inspection means 303 and the defect data analysis means 304 operate in the same way as in the first embodiment.

Upon completion of defect analysis, the sampling means 308 reads in the sampling condition file 312 and defect data 102 including the distribution characteristic information of one wafer from the storage means 302. The defect data 102 may be passed without using the storage means 302. Next, operation is performed according to the distribution characteristic category to which the defect data belongs. IF the defects are ring and blob type regional defects, sampling is performed by using the sampling condition related to the pattern information added. Otherwise, sampling is performed according to the sampling condition of the distribution characteristic category. As a result of sampling, a flag indicating review/non-review to be performed is added to the defect data and stored as a defect data 102 including the results of inspection, analysis, and sampling in the storage means 302.

Figure 21:
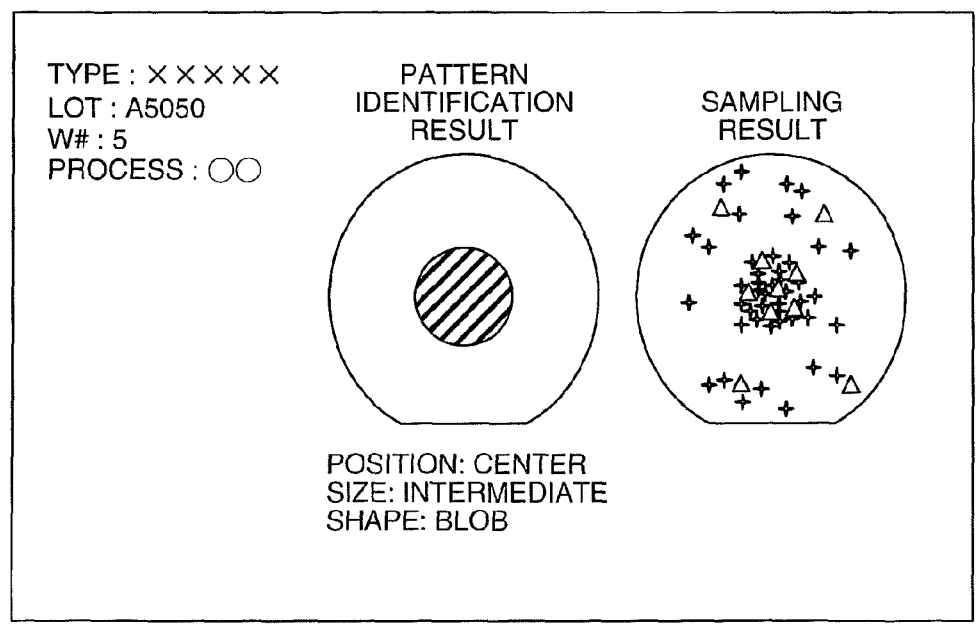
FIG. 21 shows an example of a defect data analysis result display screen.

The pattern image 706 selected by the defect data analysis means 304 is displayed by the display means 305 together with the information related to the wafer to be inspected and the patter information added to the pattern. The defect sampled is displayed on the wafer map with a color or symbol different from the other defects. FIG. 21 shows an example of result display.

The user pattern registration means 306 operates in the same way as in the first embodiment. However, the apparatus may also have configuration without this.

Next, explanation will be given on a review system using the defect data analysis method of the present invention.

Figure 22:
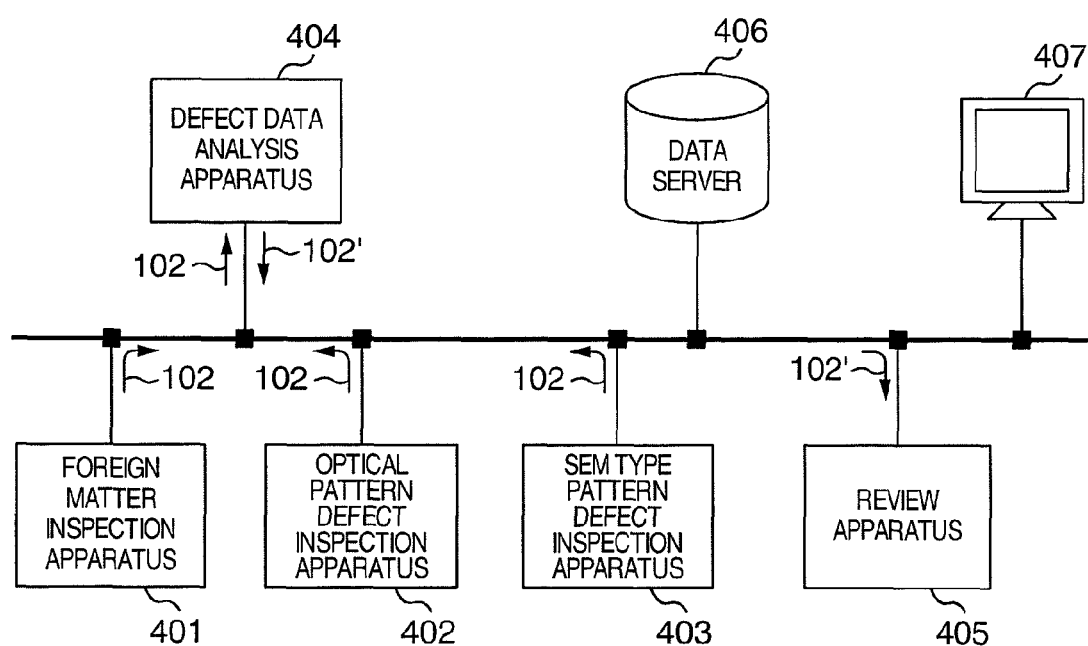
FIG. 22 shows a configuration example of the review system according to the present invention.

FIG. 22 explains the review system according to the present invention.

The review system includes a foreign matter inspection apparatus 401, an optical pattern defect inspection apparatus 402, an SEM type pattern defect inspection apparatus 403, a defect data analysis apparatus 404, and a review apparatus 405 connected to a network. The inspection apparatuses 401 to 403 and the review apparatus 405 are arranged in a clean room. the defect data analysis apparatus 404 may be in any place.

The results inspected by the inspection apparatuses 401 to 403 are file-output as defect data 102 in the same format and transferred to the defect data analysis apparatus 404. The defect data analysis apparatus 404 has configuration of the inspection apparatus shown in FIG. 20 excluding the inspection means 303. The defect data analysis apparatus 404 reads in the defect data 102 of the wafer to be analyzed, classifies the defects into a distribution characteristic category and performs sampling according to the classification result. The distribution characteristic information and the sampling flag are added to the defect data 102, which is file-output and transferred as defect data 102' to the review apparatus 405.

The review apparatus 405 reads the defect data 102' having the sampling flag corresponding to the wafer specified to be reviewed, reviews the defects according to the information, and manually or automatically classifies the defects. The category number as a classification result is added to the defect data 102', a file is output, and transferred to the defect data analysis apparatus 404. Simultaneously with this, associated review image is also transferred.

According to the defect distribution pattern and the defect review result of the wafer to be analyzed, the defect data analysis apparatus 404 creates and stores a report. Information described in the report includes the information on the wafer as an object, the distribution characteristic category classification result, and the review image. Since the distribution characteristic and the defect review image are simultaneously displayed, it becomes easier to identify a defect cause. According to a user request, more detailed information may also be described including the sampling position information, defect type ratio calculated from the review result and the sampling ratio, and other information obtained by known analysis means. The report file format is not limited to a specific one. The report file may be formatted in the HTML format which is uploaded in a data server 406 connected by the Internet or Intranet so that it can be read from an arbitrary terminal 407.

The review system which has been explained above includes three types of inspection apparatuses and one review apparatus. However, the system may include only one inspection apparatus and one review apparatus. Moreover, the system may include a plurality of inspection apparatuses and review apparatuses. When the inspection apparatus has configuration identical to the inspection apparatus according to the second embodiment of the present invention, the function of the defect data analysis apparatus can be realized in the inspection apparatus and it is possible to exclude an independent defect data analysis apparatus.

The aforementioned defect data analysis method, the inspection apparatus or the review system using the method assume that defect data of one wafer is to be processed. However, when not sampling but identification of defect distribution is to be performed, a plurality of wafers may also be analyzed. In this case, defect position coordinates of the plurality of wafers are superimposed and a high density area image is created according to the superimposed defect position coordinates.

According to the present invention, it is possible to easily identify a defect cause since according to the defect position coordinates inspected by the inspection apparatus, the defects are classified into distribution characteristic categories attributed to different generation causes: repeated defects, clustered defects, arc-shaped regional defects, radial regional defects, line type regional defects, ring and blob type regional defects, and random defects.

Moreover, since a high density area image representing the high defect density portion is created with an optimal size, it is possible to extract a pattern area even if the pattern is a very weak defect distribution pattern.

Moreover, according to the present invention, the high density area image is classified into one of the plurality of geometric patterns and accordingly, it is possible to realize a defect distribution state analysis at a practical level of the calculation time and the storage capacity.

Furthermore, since it is possible to define each of the plurality of geometric patterns, it is possible to easily identify the defect cause including the device and process failure.

The invention may be embodied in other specific forms without departing from the spirit or essential characteristics thereof. The present embodiment is therefore to be considered in all respects as illustrative and not restrictive, the cope of the invention being indicated by the appended claims rather than by the foregoing description and all changes which come within the meaning and range of equivalency of the claims are therefore intended to be embraced therein.

What is claimed is:

1. A defect data analysis method comprising steps of:
    obtaining a distribution of defects based on defect position information obtained by inspecting a substrate with an inspection apparatus; and
    identifying the defect distribution as one of a plurality of distribution characteristic categories including at least a circular arc shaped regional defects category and classifying the defect distribution into an identified one of the distribution characteristic categories;
    wherein a step of identifying as the circular arc shaped regional defects includes sub-steps of:
    obtaining a center candidate point of the defect distribution of the circular arc shaped regional defects from the defect distribution based on defect position information obtained by inspecting a substrate using Cartesian coordinates; and
    extracting the circular arc shaped regional defects from corresponding polar coordinate information using the center candidate point as an origin.

2. The defect data analysis method as claimed in claim 1, wherein the center candidate point of the defect distribution is extracted as a point having more intersections of perpendicular bisectors of straight lines connecting two arbitrary defects among the defects distributed on the substrate.

3. The defect data analysis method as claimed in claim 1, wherein the sub-step of extracting the circular arc shaped regional defects includes a step of detecting a horizontal segment on the corresponding polar coordinate and a step of inversely converting the detected horizontal segment into Cartesian coordinates.

4. The defect data analysis method as claimed in claim 1, wherein the distribution characteristic categories further includes repeated defects, clustered defects, line type regional defects, ring and blob type regional defects and random defects.

5. A defect data analysis method comprising steps of:
obtaining defect distribution on a substrate from defect position information obtained by inspecting the substrate with an inspection apparatus,
identifying repeated defects by using the defect position information, wherein the repeated defects are defects which are distributed on the substrate in a repeated pattern;
identifying clustered defects by using the defect position information, wherein a the clustered defects are defects which are distributed on the substrate in a cluster;
identifying circular arc shaped regional defects by using the defect position information, wherein the circular arc shaped regional defects are defects which are distributed on the substrate in a circular arc shape;
identifying line type regional defects by using the defect position information, wherein the line type regional defects are defects which are linearly distributed on the substrate;
identifying ring and blob type regional defects by using the defect position information, wherein the ring and blob type regional defects are defects which are distributed on the substrate in a ring and blob shape;
identifying random defects by using the defect position information, wherein the random defects are defects which are randomly distributed on the substrate; and
classifying the identified defects using a processor into corresponding regional defect categories,
wherein the step of identifying the circular arc shaped regional defects includes substeps of:
obtaining a center candidate point of the defect distribution of the circular arc shaped regional defects from the defect distribution based on defect position information obtained by inspecting a substrate using the Cartesian coordinates; and
extracting the circular arc shaped regional defects from corresponding polar coordinate information using the center candidate point as an origin.

6. The defect data analysis method as claimed in claim 5, wherein the center candidate point of the defect distribution is extracted as a point having more intersections of perpendicular bisectors of straight lines connecting two arbitrary defects among the defects distributed on the substrate.

7. The defect data analysis method as claimed in claim 5, wherein the sub-step of extracting the circular arc shaped regional defects includes a step of detecting a horizontal segment on the corresponding polar coordinate and a step of inversely converting the detected horizontal segment into Cartesian coordinates.

8. A defect data analysis apparatus comprising:
input means for inputting defect position information obtained by inspecting a substrate;
defect distribution calculation means for obtaining distribution of defects based on defect position information obtained by inspecting a substrate with an inspection apparatus;
regional defect distribution classification means for classifying the defect distribution into one of a plurality of distribution characteristic categories including at least a circular arc shaped regional defects category; and
output means for outputting the classified defect distribution,
wherein the regional defect distribution classification means identifies the defect distribution as the circular arc shaped regional defects category by obtaining a center candidate point of the defect distribution of the circular arc shaped regional defects from the defect distribution based on defect position information obtained by inspecting a substrate using the Cartesian coordinates and extracting the circular arc shaped regional defects from corresponding polar coordinate information using the center candidate point as an origin.

9. The defect data analysis apparatus as claimed in claim 8, wherein the center candidate point of the defect distribution is extracted as a point having more intersections of perpendicular bisectors of straight lines connecting arbitrary two defects among the defects distributed on the substrate.

10. The defect data analysis apparatus as claimed in claim 8, wherein the distribution characteristic categories further includes repeated defects, clustered defects, line type regional defects, ring and blob type regional defects and random defects.

11. The defect data analysis apparatus as claimed in claim 10, wherein the output means includes a display section for displaying the classified distribution shape of defects, wherein the distribution shape characteristic categories are each displayed.

* * * * *